March 6, 1956 W. H. HAUPT ET AL 2,737,596
X-RAY APPARATUS
Filed Oct. 28, 1950 6 Sheets-Sheet 1
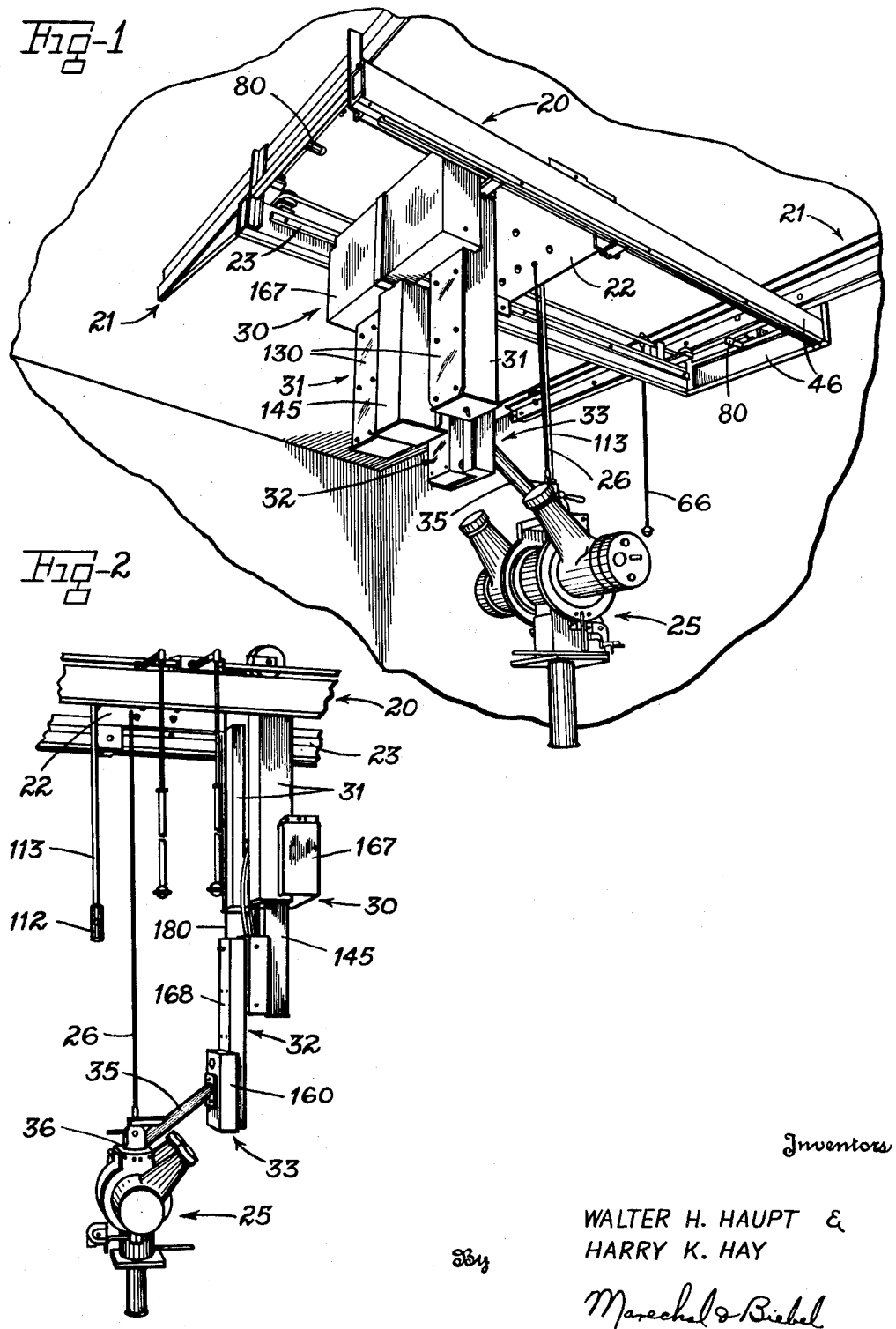
Inventors
WALTER H. HAUPT &
HARRY K. HAY
By Marechal & Biebel
ATTORNEYS

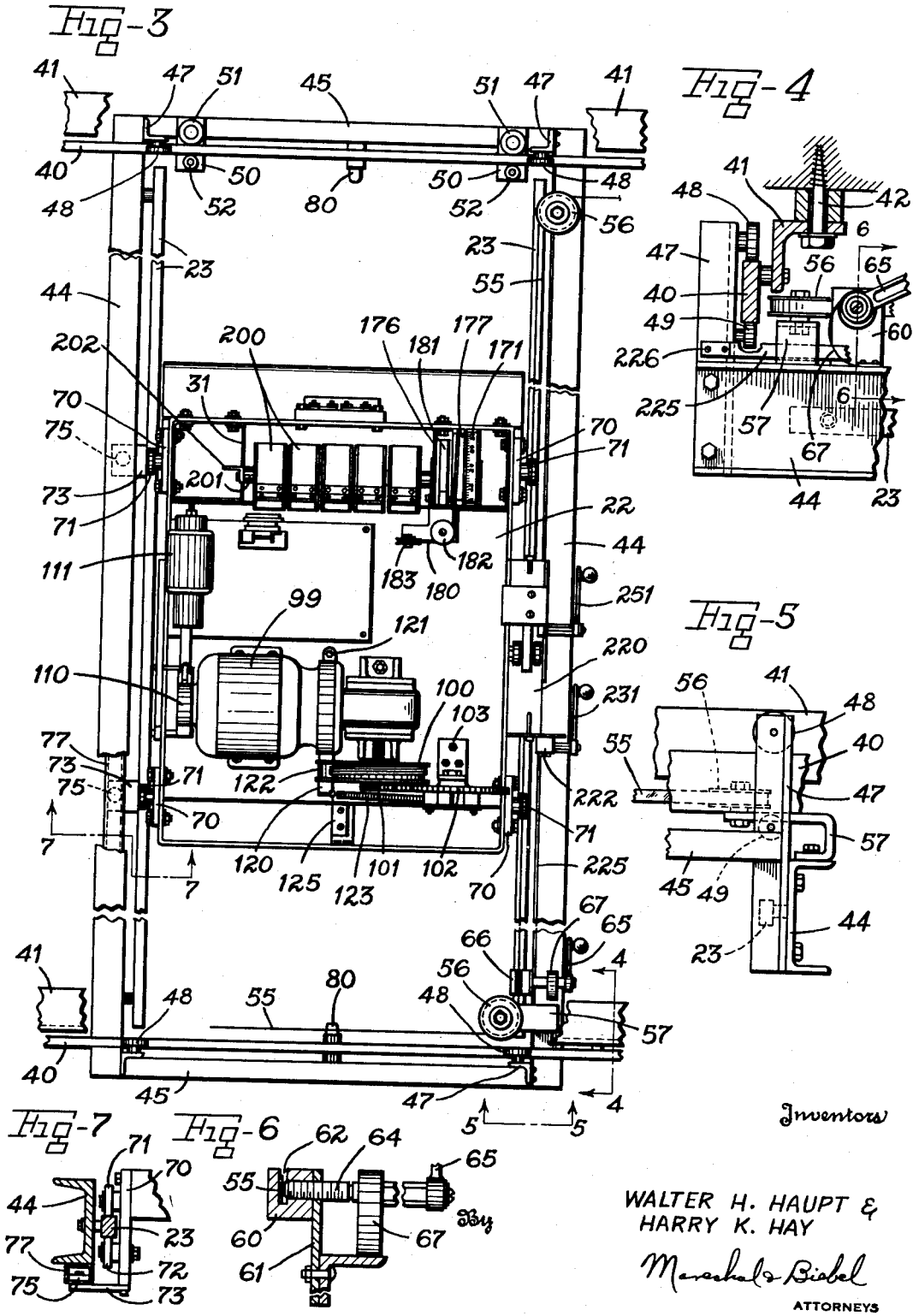

March 6, 1956
W. H. HAUPT ET AL
2,737,596
X-RAY APPARATUS
Filed Oct. 28, 1950
6 Sheets-Sheet 3
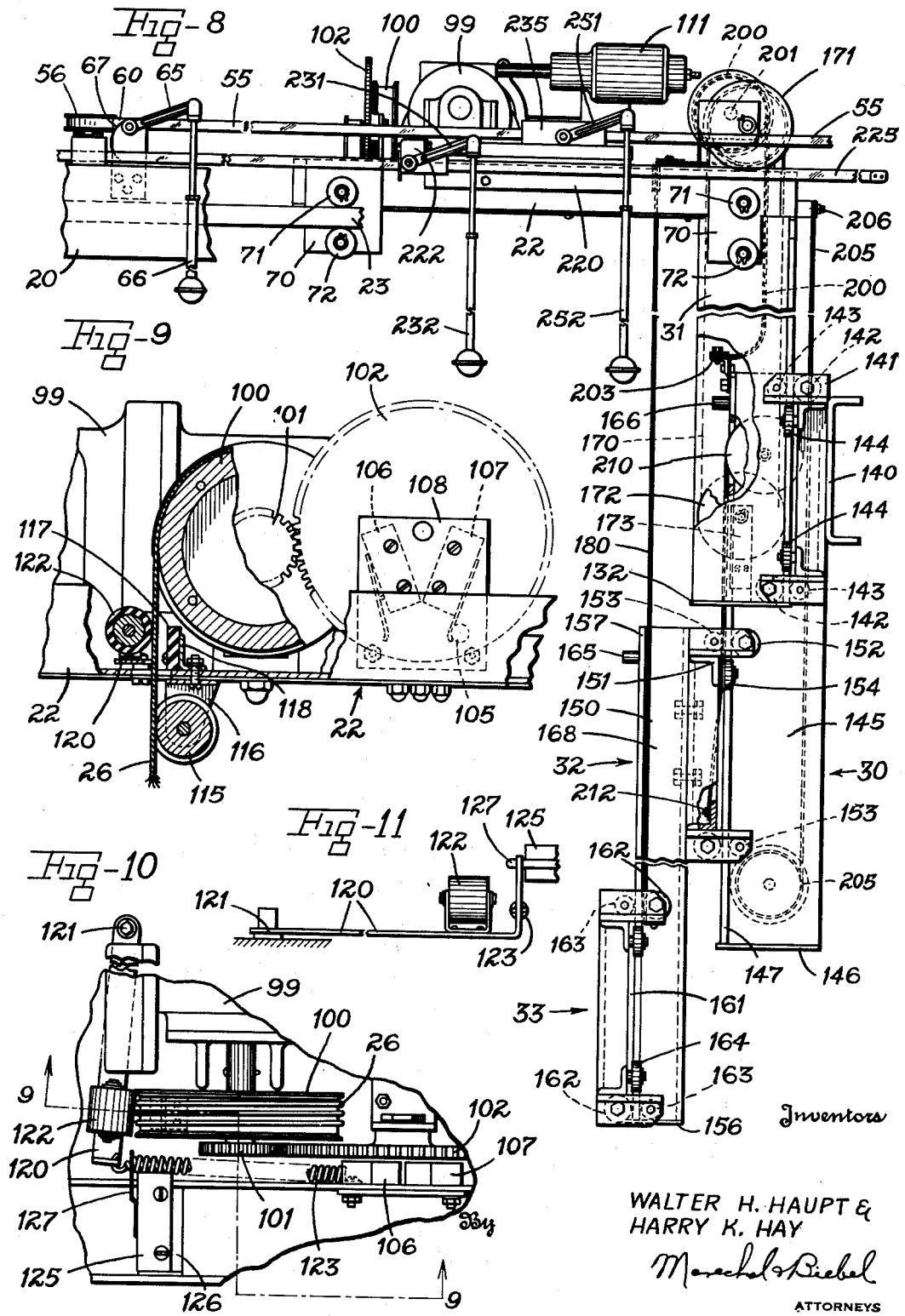
Inventors
WALTER H. HAUPT &
HARRY K. HAY
Marechal & Biebel
ATTORNEYS

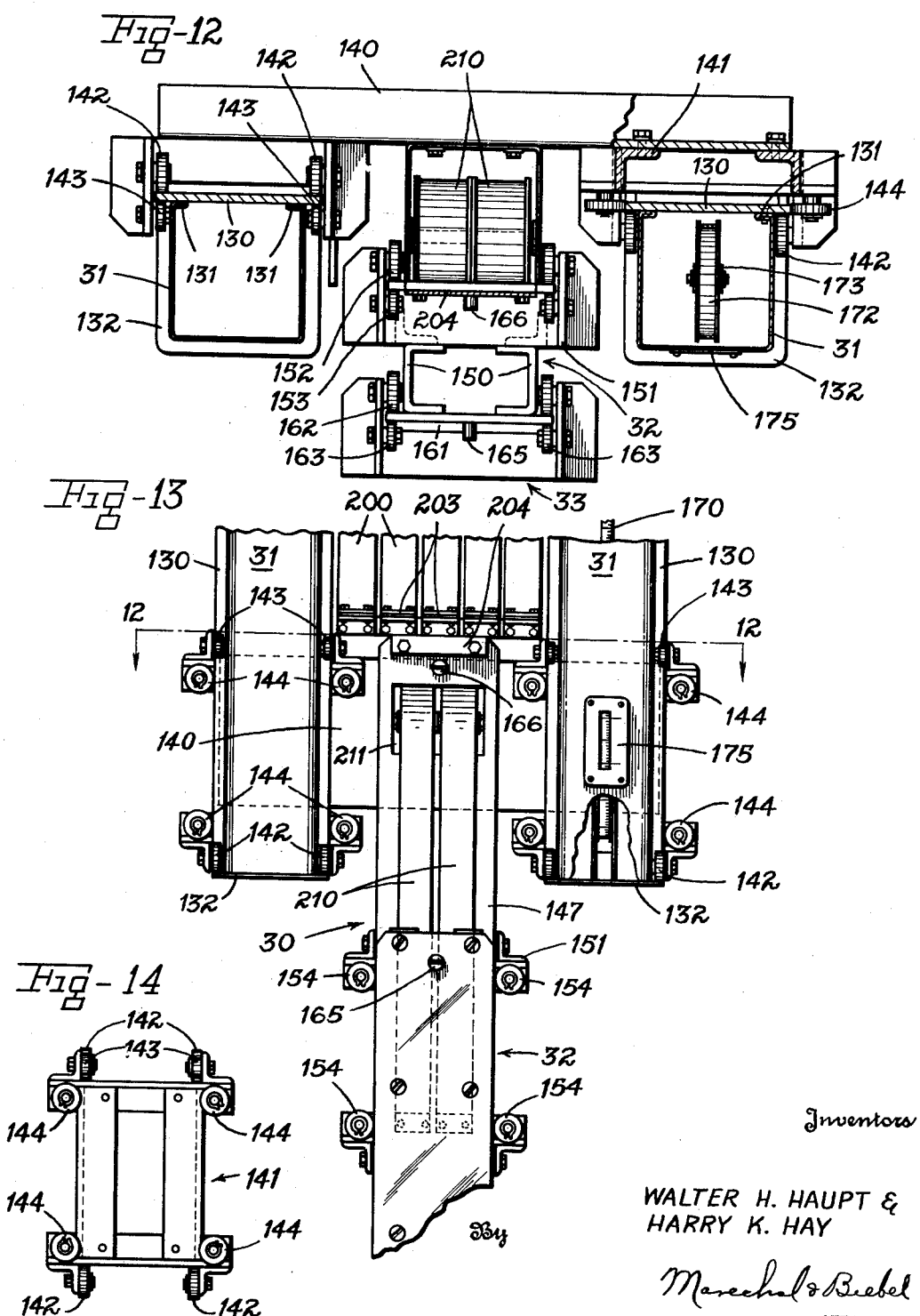

March 6, 1956  W. H. HAUPT ET AL  2,737,596
X-RAY APPARATUS
Filed Oct. 28, 1950  6 Sheets-Sheet 5
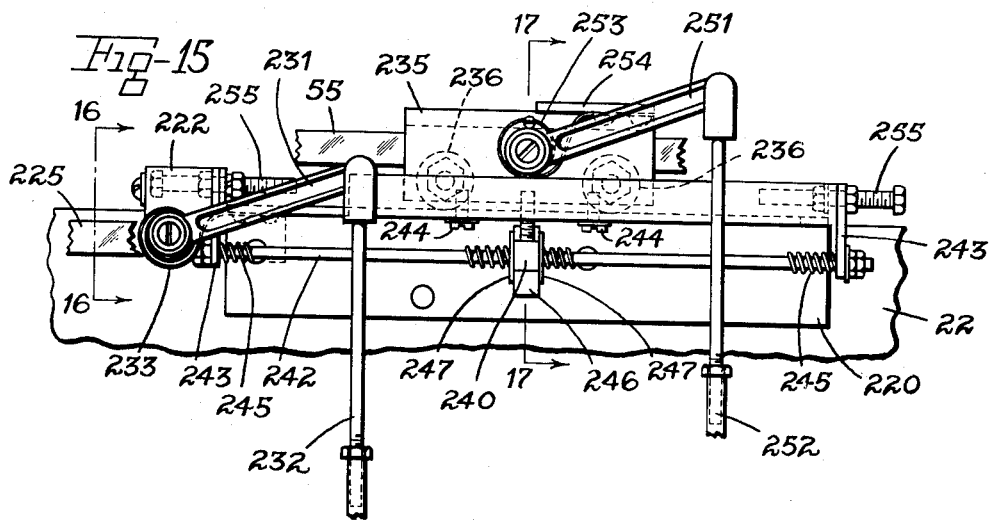
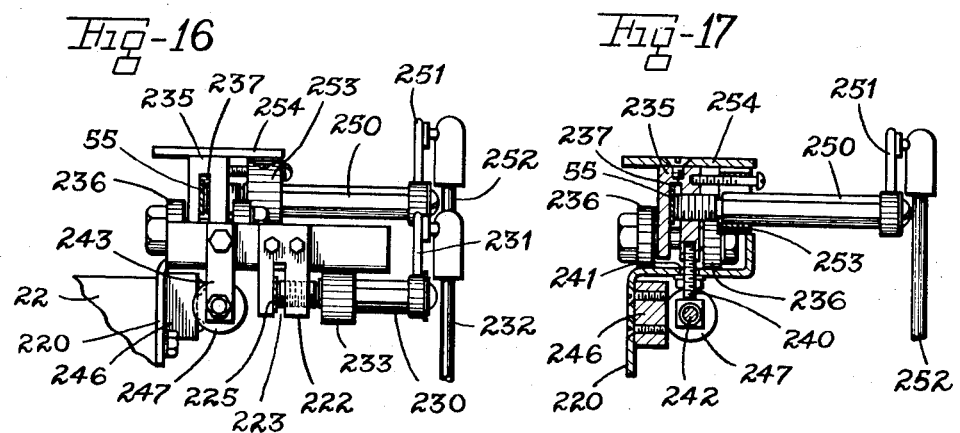
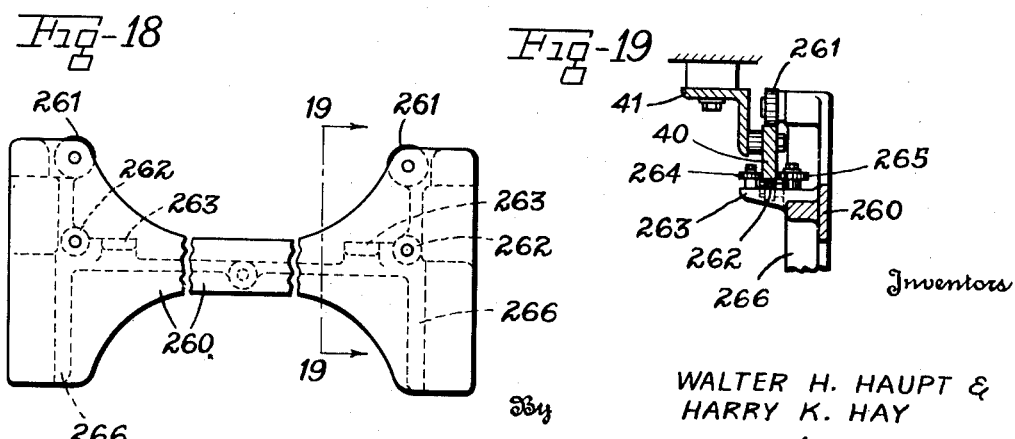
INVENTORS
WALTER H. HAUPT &
HARRY K. HAY
Marechal & Biebel
ATTORNEYS

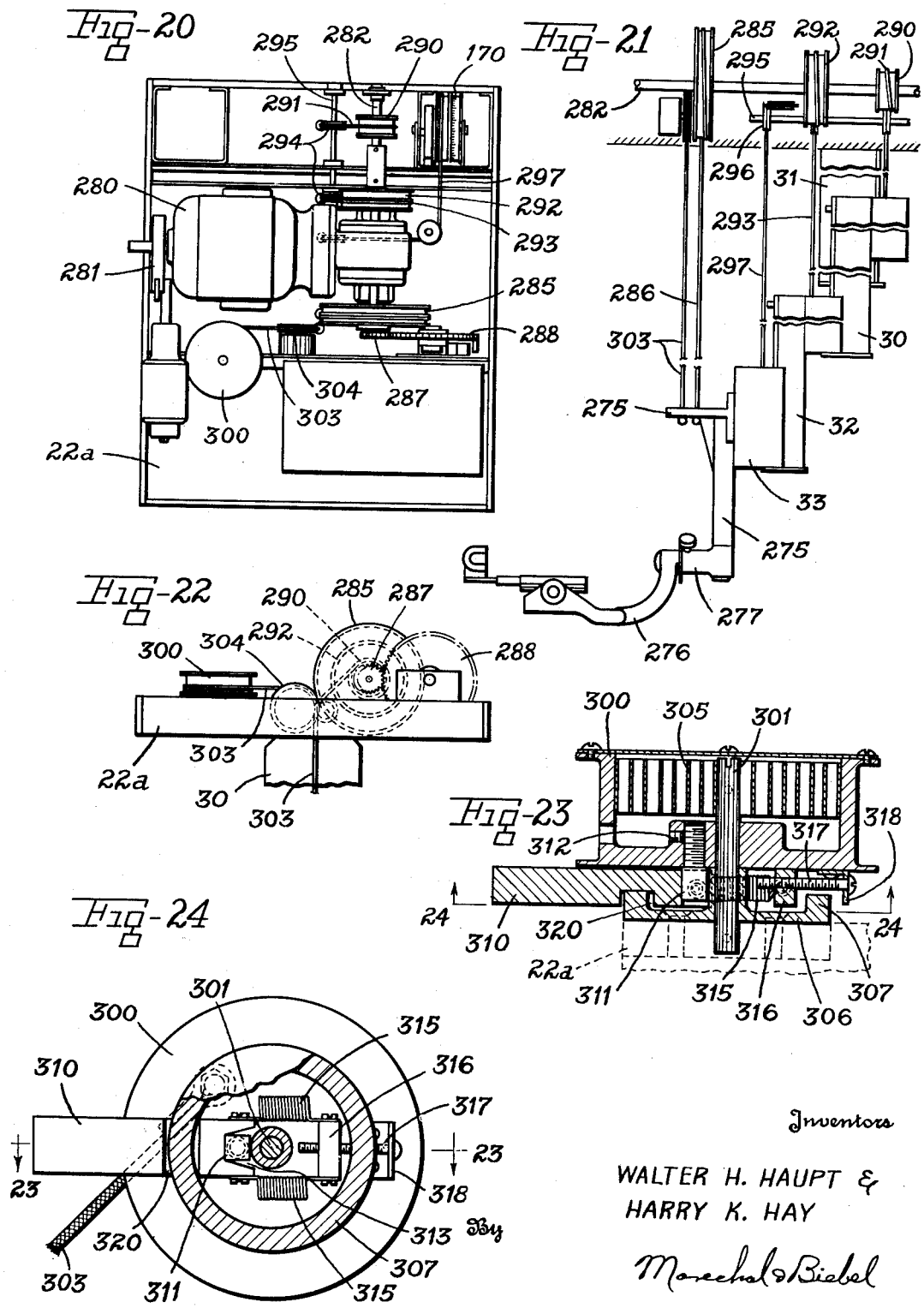

United States Patent Office 2,737,596
Patented Mar. 6, 1956

2,737,596

X-RAY APPARATUS

Walter H. Haupt, Kenton Hills, and Harry K. Hay, Fort Thomas, Ky., assignors to Keleket X-Ray Corporation, a corporation of Ohio Application October 28, 1950, Serial No. 192,682

19 Claims. (Cl. 250—91)

This invention relates to apparatus for supporting an X-ray tube head for use, and the invention has particular relation to an X-ray tube stand which is adapted to be mounted on a ceiling above the X-ray table or other working station on which the tube head is to be used.

It is one of the principal objects of the invention to provide an X-ray tube stand which is adapted to be directly connected to the ceiling or walls of a hospital or other X-ray examination room above the table for receiving the patient, which thus supports the tube head from above the table and leaves free access to the table from all sides and ends thereof, which includes adequate bracing and guiding structure to maintain the tube head stationary during operation, and particularly to provide such a tube support which is constructed to give a full range of adjusting movement of the tube head vertically as well as horizontally even in rooms having low ceilings such as are commonly found in hospitals and modern office buildings.

The invention accordingly provides a tube stand having rails which are constructed for mounting on the ceiling or other permanent structure in the hospital room, doctor's office or other installation, and which support a longitudinal carriage for movement thereon. The longitudinal carriage in turn includes track rails on which is mounted a transverse carriage for movement transversely of the direction of travel of the longitudinal carriage. In order to facilitate retraction of the tube head to the desired height when it is not in use, a plurality of vertical carriages are provided which are arranged in series for relative vertical movement, with the uppermost of these vertical carriages being mounted on the transverse carriage and with the lowermost thereof secured to the tube head, and these vertical carriages and the transverse carriage incorporate extended guiding members which brace the assembly against swaying or other angular movement of the tube head to maintain the tube in proper fixed relation to the table during use.

Another object of the invention is to provide a tube stand adapted for ceiling mounting which supports the tube head for easy adjusting movement in both horizontal and vertical planes as required for the particular use to be made thereof, which includes positive locking and safety mechanisms for assuring proper operation thereof and for maintaining the position of the tube head in desired relation to the table or other working station during use, and which makes it possible to raise the tube head quickly to a conveniently out of the way height in the room when it is not in use.

It is also an object of the invention to provide a tube stand adapted for ceiling mounting which incorporates correlated selectively operable lock units for maintaining the tube head in desired fixed position horizontally of the table or other working station, and particularly to provide such locking units which are operable in coordinated relation to effect movement of the tube head through a predetermined limited distance either longitudinally or transversely of the table for purposes of stereoradiography.

Still another object of the invention is to provide a ceiling mounted tube stand having a power drive for raising and lowering the tube head by means of a cable and which incorporates a safety device for automatically stopping the drive in the event of slackening of the cable to prevent fouling thereof.

Other objects and advantages of the invention will be apparent from the following description, the accompanying drawings and the appended claims.

In the drawings—

Fig. 1 is a perspective view of a tube stand in accordance with the invention, the view being at an angle from the rear;

Fig. 2 is a fragmentary perspective looking in the approximately opposite direction from Fig. 1;

Fig. 3 is a plan view of the tube stand, with portions broken away;

Fig. 4 is a fragmentary section on the line 4—4 of Fig. 3;

Fig. 5 is a fragmentary view of one corner of the longitudinal carriage looking in the direction indicated by the line 5—5 of Fig. 3;

Fig. 6 is a fragmentary section on the line 6—6 of Fig. 4 showing the lock for the longitudinal carriage;

Fig. 7 is a fragmentary section on the line 7—7 of Fig. 3;

Fig. 8 is a fragmentary view of the tube stand partly in side elevation and partly broken away;

Fig. 9 is an enlarged fragmentary section on the line 9—9 of Fig. 10;

Fig. 10 is an enlarged fragmentary plan view of a portion of the transverse carriage showing the mechanism for preventing fouling of the cable supporting the tube head;

Fig. 11 is a fragmentary view in side elevation looking from left to right in Fig. 10;

Fig. 12 is a section through the vertical carriage assembly taken on the line 12—12 of Fig. 13;

Fig. 13 is a fragmentary front elevational view of the vertical carriage assembly;

Fig. 14 is a detail view of one of the framework or carriage units employed in the vertical carriages;

Fig. 15 is a fragmentary view in side elevation showing the lock assembly on the transverse carriage;

Fig. 16 is a fragmentary section on the line 16—16 of Fig. 15;

Fig. 17 is a section on the line 17—17 of Fig. 15;

Fig. 18 is a detail view in front elevation showing a modified construction of end member for the longitudinal carriage;

Fig. 19 is a fragmentary view on the line 19—19 of Fig. 18 showing the longitudinal carriage in mounted position;

Fig. 20 is a somewhat diagrammatic plan view of the horizontal carriage showing a modified supporting and driving arrangement for the vertical carriages;

Fig. 21 is a diagrammatic side view of the vertical carriage arrangement of Fig. 20;

Fig. 22 is a fragmentary view in front elevation of the horizontal carriage arrangement of Fig. 20;

Fig. 23 is a vertical section showing the safety mechanism for preventing dropping of the tube head if the main supporting cable should break, the view being in section on the line 23—23 of Fig. 24; and Fig. 24 is a section on the line 24—24 of Fig. 23.

Referring to the drawings, which illustrate preferred embodiments of the invention, Figs. 1 and 2 show the general appearance and arrangement of the ceiling mounted tube stand, in which the longitudinal carriage 20 is mounted on tracks 21 adapted to be directly secured to the ceiling of the room. The longitudinal carriage supports the transverse carriage 22 for movement along rails 23 extending along carriage 20 transversely of the tracks 21. The tube head 25 is suspended from the transverse carriage by a cable 26, and it is maintained in desired braced and guided relation with the carriage 22 by means of a series of vertical carriages supported for relative movement on each other and on the transverse carriage. Thus the uppermost carriage 30 is mounted on columns 31 extending downwardly from the transverse carriage, the intermediate vertical carriage 32 is mounted on carriage 30, and the lowermost vertical carriage 33 is mounted on carriage 32 and is in turn connected with the tube head 25 by means of a bracket arm 35, which may incorporate a swivel mounting for the tube head as indicated at 36.

The construction of the longitudinal carriage 20 and tracks 21 is shown in detail in Figs. 3 to 6. Each of the tracks 21 includes a rail 40 bolted to an angle 41 adapted to be bolted at 42 or otherwise secured directly to the ceiling structure of the room. The longitudinal carriage 20 is a rectangular frame comprising side channels 44 and end bars 45 each of which may be provided with a cover 46 (Fig. 1). At each end of the bars 45 is an upstanding angle 47 which carries a pair of rollers 48 and 49 arranged to ride on the upper and lower edge respectively of the rails 40 to support the carriage 20 for free movement along these rails. In order to maintain the carriage 20 in accurate transverse relation with the rails 40, one of the end bars 45 is provided with a pair of brackets 50 which extend below rails 40 and carry pairs of rollers 51 and 52 engaging the sides of rails 40 as shown in Fig. 3.

In order to provide for locking of the carriage 20 against movement on tracks 21, a locking tape 55 is secured at its ends (not shown) to tracks 21 or other stationary structure, and the tape 55 is arranged in generally Z-shaped pattern around rollers 56 at each end of one of the channels 44, each roller 56 being carried by a bracket 57 bolted to the channel as shown in Fig. 5. A locking block 60 is carried by an arm 61 bolted to this channel 44 and has a slot 62 (Fig. 6) receiving tape 55 therethrough. A locking screw 64 is threaded in block 60 and is provided with an operating lever 65 and a downwardly extending handle 66 so that when the handle 66 is pulled, the screw 64 clamps tape 55 in block 60 and thus locks carriage 20 against travel. A torsion spring 67 is secured to the lock screw 64 and to the upper surface of channel 44 for supporting the weight of the lever 65 and handle 66 to prevent accidental locking movement of screw 64.

The transverse carriage 22 is shown in detail in Figs. 3 and 7-11. The rectangular plate which is the main structure member of carriage 22 is mounted on carriage 20 by means of brackets 70 which carry rollers 71 and 72 riding on the upper and lower edges of the rails 23 bolted to the channel member 44 of carriage 20. The carriage 22 is maintained in accurately aligned relation with carriage 20 by means of bracket arms 73 (Fig. 7) each of which carry a roller 75 riding in an inverted channel shaped track 77 secured to the underside of one of the channels 44. Bumpers 80 are mounted on each of the end bars 45 of the longitudinal carriage to limit movement of the transverse carriage 22.

A motor 99, shown as of the gear head type, is mounted on transverse carriage 22 for driving a drum 100 on which the cable 26 is wound to raise and lower the tube head 25. The motor shaft also carries a pinion 101 meshing with a large gear 102 mounted on carriage 22 by means of a bracket 103. The gear 102 is a part of the mechanism for limiting operation of motor 99 in both directions, and it carries a pin 105 arranged for engagement with the operating arms of each of the limit switches 106 and 107 on a bracket 108. The motor 99 is also shown as provided with a brake 110, satisfactory results having been obtained with this brake being operated by a solenoid 111 connected with the motor circuits in such manner as to release the brake when the motor is energized and to cause the brake to be applied when the motor stops. The control switch 112 for motor 99 may be located at any convenient position and is shown as suspended from carriage 22 by an electric cable 113.

A special arrangement is provided for preventing fouling of cable 26 in the event that the tube head should reach its lower position or otherwise be stopped from descending while motor 99 continues to operate in the direction to unwind the cable. Referring to Figs 9-11, the cable 26 runs on a roll 115 pivoted in a yoke 116 bolted to the underside of carriage 22. A rubber friction block 117 is carried by a bracket 118 on the upper side of carriage 22 in laterally spaced relation with the path of cable 26 between drum 100 and roller 115. An arm 120 is pivoted at 121 to carriage 22 and carries a roller 122 engaging the opposite side of cable 26 from friction block 117. A spring 123 biases arm 120 towards friction block 117, but the tension of spring 123 is such as to be overcome when the cable is pulled taut by the weight of the tube head.

A normally closed switch 125 is mounted on carriage 22 by a bracket 126 and its operating arm 127 extends into the path of the upstanding end portion of arm 120 as shown in Fig. 11, the switch 125 being so connected in the circuits for motor 99 as to effect stopping of the motor when switch 125 is opened. Thus so long as the cable 26 is held taut by the weight of the tube head, the arm 120 will be forced in clockwise direction as viewed in Fig. 10 so that its end is held away from switch arm 127. However, if the cable should slacken, as by stoppage of the tube head from descending while the motor 99 is still operating to unwind the cable, spring 123 will pull arm 120 in counterclockwise direction until the cable is gripped between the roller 122 and friction block 117, and at the same time the end portion of arm 120 will engage switch arm 127 and thus cause switch 125 to open and shut off the motor.

The columns 31 on the transverse carriage 22 which support the vertical carriage 30 are best seen in Figs. 8, 12 and 13. Each column 31 has the general form of a square channel, and an elongated plate 130 is mounted on the open side thereof and extends laterally and beyond on both sides, the edges 131 of the columns being flanged inwardly for bolting to the plates 130, and these plates form vertical tracks on which the carriage 30 rides. Each column 31 is bolted or otherwise secured at its upper end to the transverse carriage 22 as shown in Fig. 3 to provide a rigid mounting for the plates 130 with respect to the transverse carriage, and each column 31 is provided with a bottom plate 132 on its lower end.

The uppermost vertical carriage 30 is generally saddle shaped in horizontal section and comprises a channel 140 extending laterally across the width of both of columns 31. At either end of the channel 40 is bolted a framework 141 shown in detail in Fig. 14 and composed of a plurality of angle irons, the frameworks 141 carry a plurality of rollers which engage both surfaces and both edges of the plates 130. At each corner of each framework 141 is a pair of rollers 142 and 143 of different sizes, the larger roller 142 of each of the upper pairs riding on the front surface of one of plates 130 while the larger roller 142 of each bottom pair rides on the rear surface of plate 130 to support the angular load of carriages 32 and 33 on columns 31. An additional four rolls 144 carried by each framework 141 engage the edges of plates 130 for lateral guiding action.

The carriage 30 is generally T-shaped as viewed from the front and includes a column 145 having a bottom plate 146, and a plate 147 similar to plates 130 is bolted to column 145 and forms a track for the vertical movement of carriage 32. The main structural members of carriage 32 are a pair of channels 150 arranged as shown in Fig. 12 and bolted to a framework 151 similar to the framework 141 and carrying similar rollers 152, 153 and 154 engaging the sides and edges of the plate 147 as shown in Figs. 8 and 13. The carriage 32 has a bottom plate 156 and also carries a plate 157 similar to the plates 130 and forming a track for the vertical carriage 33, which comprises primarily a framework 160 similar to the framework 141 and provided with a cover 161 to which the bracket 35 is secured and with rollers 162, 163 and 164 riding on plate 157 as shown in Figs. 8 and 12.

It will thus be seen that each of the carriages 33 and 32 is mounted for relative vertical movement along the next higher vertical carriage in the series, with the carriage 30 being similarly mounted for vertical movement on the columns 31. Upward movement of carriage 33 on carriage 32 is limited by a bumper 165, and upward movement of carriage 32 on carriage 30 is limited by a similar bumper 166. Relative downward movement of the several carriages is limited by the bottom plates 132, 146 and 156. The arrangement of track plates and carriages accordingly provides a strong guiding action for the tube head 25 which effectively prevents twisting or swaying thereof and holds the two accurately in desired position for use. Carriages 30 and 32 are shown in certain views as provided with covers 167 and 168, respectively, these covers being removed in other views for greater clarity of illustration.

A scale 170 is provided for automatically indicating the height of the tube head above the table or other reference position. A scale 170 is shown as a continuous band running around a pulley 171 on transverse carriage 22 and a pulley 172 supported by a yoke 173 at the lower end of the right-hand column 31 as viewed from the front. A window 175 in the front of this column includes an index marker for the scale 170. The pulley 171 is mounted in a channel bracket 176 on the same shaft with a drum 177 carrying a cable 180 and provided with a spring return 181 for rewinding the cable. This cable 180 is guided around pulleys 182 and 183 to a hole through carriage 22, and the lower end of this cable is secured to the carriage 33. Thus movement of carriage 33 causes rotation of the drum 177 through cable 180 and the spring return 181, which in turn causes pulley 171 to rotate and to move the scale 170 with respect to window 175 in coordinated relation with the movements of the tube head.

Counterbalancing means are provided for the vertical carriages to limit the load on the cable 26 and motor 99, and the counterbalancing action is effective to cause progressive movement of the vertical carriages, with the carriage 33 descending first, then the carriage 32 and finally the carriage 30, thus maintaining the maximum proportion of the assembly as high in the room as possible at all time. The counterbalances include a plurality of spiral springs, which may be single or double as required for the total counterbalancing force desired, satisfactory results having been obtained with springs having the characteristic of producing a uniform pull throughout their length of extension, such as the spiral springs sold under the tradename "Negator" by Hunter Spring Company, Lansdale, Pennsylvania.

Five of these springs 200 are shown mounted on the transverse carriage 22 by means of a shaft 201 carried by the bracket 176 and an angle 202 bolted to one of the columns 31. The outer ends of these springs 200 are secured by brackets 203 to a plate 204 bolted to the upper end of the track plate 147 on carriage 30. An additional pair of springs 205 is mounted within the lower end of the column 145, and the free ends of these springs are bolted to a bracket 206 at the rearward end of the transverse carriage 22. The counterbalance for the carriage 32 similarly comprises a pair of sprial springs 210 mounted within the upper end of the column 145, double springs being used to provide adequate counterbalancing force in the comparatively restricted space. The ends of the springs 210 extend through an opening 211 in the upper end of the track plate 147 and are secured at 212 to the framework 151 as best seen in Fig. 8. Since the carriage 33 is light in weight in comparison with carriages 30 and 32, having no track plate thereon, no counterbalance is shown therefor, and it is supported with the tube head by the cable 26. In operation, carriage 33 descends first with the tube head 25 when the cable 26 is unwound from drum 100. When carriage 33 reaches its lowermost point on carriage 32, as determined by contact between it and the bottom plate 156, the carriage 32 will descend and subsequently pull down the carriage 30 by contact between the framework 151 and the bottom plate 146. It should also be noted that if it is desired to eliminate the power drive for raising and lowering the tube head, it would be necessary merely to add more springs in sufficient quantity to effect counterbalancing of the tube head itself and of carriage 33, for example by connecting additional springs between carriages 32 and 33 similarly to the springs 210 between carriages 30 and 32.

The transverse carriage 22 is provided with a lock for securing it in fixed position against transverse movement along longitudinal carriage 20, and it also has a locking assembly which cooperates with the longitudinal lock on carriage 20 and with the transverse lock to provide for stereoshifting of either carriage for purposes of stereoradiography. Referring to Figs. 15–17, a Z-shaped bracket 220 is mounted on one side of carriage 22 and carries a locking block 222 similar to block 60 and having a slot 223 therethrough for receiving a locking tape 225 secured at each end to one of the angles 47 as shown at 226 in Fig. 6. A lock screw 230 is threaded in the block 222 for clamping engagement with the tape 225 and is provided with an operating arm 231 and a handle 232. A torsion spring 233 is secured to the screw 230 and to the underside of bracket 220 for supporting the weight of arm 231 and handle 232 to prevent accidental locking.

The lock for stereoradiography includes a block 235 mounted for longitudinal movement on the upper surface of bracket 220 by means of rollers 236 and having a slot 237 for receiving locking tape 55 therethrough. A bolt 240 extends into a block 235 through a slot 241 in bracket 220 and has its head slidably mounted on a rod 242 carried by arms 243 depending from each end of bracket 220. Additional bolts 244 extend through a slot 241 into block 235 to maintain block 235 in guiding relation with bracket 220. The block 235 is normally maintained in centered position with relation to bracket 220 by a pair of comparatively light springs 245 mounted on rod 242 between the arms 243 and a block 246 bolted to the bracket 220 centrally of rod 242, washers 247 at the inner ends of springs 245 being adapted to engage the sides of block 246.

The block 235 carries a lock screw 250 for clamping engagement with tape 55 in slot 237, and screw 250 is provided with an operating lever 251 and handle 252. A torsion spring 253 is secured to screw 250 and to a plate 254 bolted to the top of block 235 to balance lever 251 and handle 252. Thus in the normal position of this unit with the screw 250 unlocked, the tape 55 rides freely through slot 237, and block 235 is maintained in centered position by the balancing action of the springs 245. Relative movement of block 235 on bracket 220 is limited by a pair of adjustable stop bolts 255 set at either end of the bracket 220.

This locking block 235 is effective for use in stereoradiography either longitudinally or laterally of the X-ray table. When the tube head is to be used for stereo work laterally of the table, the longitudinal carriage 20 is first locked in proper position with respect to the patient by means of the screw 64 as described. Transverse carriage 22 is then centered in carriage 20 with respect to the area to be radiographed, and the block 235 is locked on tape 55 by screw 250. Next the carriage 22 is moved to the right or left as viewed in Fig. 15 to one of its limit positions as determined by contact between the block 235 and one of the stop bolts 255, and it is then locked in that position by means of the block 222 and screw 230. The first exposure of the stereoradiographic pair is now made, and then the screw 230 is released and the carriage 22 moved in the opposite direction until the opposite bolt 255 strikes the block 235. The carriage 22 is then again locked by screw 230, and the other exposure is made, it being thus seen that the effective interocular for the resulting stereoradiographs is determined by the relative spacing of the stop bolts 255.

For stereoradiographs longitudinally of the table, a similar procedure is followed. First the transverse carriage is locked on tape 225 in the proper position with respect to the patient, and the longitudinal carriage 20 is then moved until the tube head is centered with respect to the area to be radiographed. The block 235 is then locked on tape 55, after which the carriage 20 is moved to either of the limit positions determined by contact between block 235 and bolts 255. The longitudinal lock 60—64 is then locked to secure the tube head in position for the first exposure, following which the procedure is repeated at the other limit position of the longitudinal carriage for the second exposure. Thus by operating the several locks in the desired sequence as described, accurate positioning of the tube head for stereoradiography either longitudinally or laterally of the table can be accomplished.

Figs. 18 and 19 show a modified construction of end member 260 which may be employed upon the longitudinal carriage in place of the end bars 45 and their associated covers 46 and angles 47. The end member 260 is a single casting which includes bosses at either end for mounting the rollers 261 and 262 for engaging the track rails 40, and this member also includes laterally projecting bosses 263 corresponding to the brackets 50 for supporting the rollers 264 and 265 engaging the sides of rails 40. Webs 266 at either end of member 260 provide mounting flanges for the ends of the channel members corresponding to parts 44 of carriage 20, and a boss 267 is provided at the middle of this member for receiving one of the bumpers 80. This part 260 is readily formed as a single casting and thus offers advantages of ease of production over the fabricated end structure shown on the longitudinal carriage 20 in the views previously described.

Figs. 20—24 show a modified construction and arrangement of the horizontal and vertical carriage assembly in which positively driven supports for the vertical carriages are used in place of the spring counterbalance arrangement previously described, and in which also a safety unit is provided for preventing dropping of the tube head in case of breakage of the main supporting cable. In Figs. 20—22, the horizontal carriage 22a corresponds to carriage 22, and the vertical carriage 30, columns 31 and vertical carriages 32 and 33 are of essentially the same construction as the same parts in the other views. A bracket 275 is secured to the carriage 33, and a tube support indicated generally at 276 is secured to this bracket by a swivel connection 277.

The carriage 22a supports the drive motor 280, which is provided with a brake 281 as previously described and which drives a relatively long shaft 282. On one end of shaft 282 is the drum 285 for the cable 286 which corresponds to cable 26 in the other views and is secured to bracket 275 to form the main support for the tube head. The pinion 287 and gear 288 in Figs. 20 and 22 correspond to gears 101 and 102 and operate in the same manner as described to actuate the limit switches when the tube head reaches its limit positions of vertical travel.

Instead of spring counterbalances for the carriages 30 and 32, each of these carriages is individually supported by a separate drum and cable on shaft 282, the drum 290 carrying a cable 291 secured at its lower end to the upper carriage 30, and the drum 292 carrying a cable 293 having its lower end secured to the intermediate vertical carriage 32. Each of these cables is guided to a suitable hole through carriage 22a by one of a pair of pulleys 294 on a shaft 295 which also carries a pulley 296 for the cable 297 which operates the scale 170 as previously described and is secured at its lower end to the carriage 33.

The three drums 285, 290 and 292 are correlated in diameter in such proportion that while each vertical carriage travels through a different total distance with respect to the horizontal carriage 22a, they all reach the end of their separate travels at the same time. Thus all carriages travel simultaneously whenever the tube head is to be adjusted vertically, but each travels at a different speed proportional to the total travel thereof, with their combined guiding and bracing action remaining the same as described in connection with the spring counterbalanced arrangement of vertical carriages.

Figs. 20-24 also show a safety unit for preventing dropping of the tube head in the event of breakage of the main supporting cable 286. A drum 300 is mounted on the carriage 22a by a pivot pin 301 and carries a cable 303 which passes over a guide pulley 304 to a hole through the carriage and has its lower end secured to the bracket 275 adjacent the cable 286. A spiral spring 305 is mounted within drum 300 in position to resist unwinding of the cable 303 and to rewind the cable thereon.

A plate 306 is bolted or otherwise secured to the carriage 22a and includes an annular track portion 307 on its upper surface. An arm 310 is pivoted at its inner end on the square head of a bolt 311 held in the hub portion of drum 300 by a set screw 312. As shown in Fig. 24, the inner end of arm 310 has a recess 313 therein provided with a flat bottom adapted to seat on the head of bolt 311 and with tapered sides permitting the arm to rock with respect to the bolt head. Arm 310 is normally held in the balanced position shown in Fig. 24 by a pair of light springs 315 secured at one end to the arm and at the other end to a block 316 adjustably secured to the underside of drum 300 by a bolt 317 and bracket 318 to provide for tensioning springs 315 as desired. The arm 310 has a slot 320 in the underside thereof which fits over the track portion 307 of plate 306 as shown.

With this construction, when the drum 300 rotates at a relatively uniform angular rate during normal raising or lowering of the tube head support, the arm 310 will rotate with the drum and will remain in its radial relation with the drum under the balancing action of the springs 315. However, if the drum 300 should accelerate at a rapid rate, such as would happen if the cable 286 should break and the tube head begin to drop, the inertia of the arm 310 would cause it to deflect from its normal position against the balancing action of the springs, and when this occurs, the edges of the slot 320 will grip the sides of the track portion 307 and act as a brake to prevent further dropping of the tube head. Test results indicate that this brake device will act within an inch of movement of cable 303, thus effectively preventing harmful dropping of the X-ray tube in case of main cable failure.

It will accordingly be seen that with all these arrangements, the tube head is maintained in firmly braced and stationary position laterally during use thereof, while at the same time an extended range of vertical adjustment for the tube head is provided even when the apparatus is mounted in a room having a comparatively low ceiling. For example, with the several carriages and supporting columns proportioned as shown, a range of vertical adjustment of approximately 42 inches for the tube head has been obtained with the parts of such dimensions that the entire supporting apparatus extends only a total of approximately 33 inches below the ceiling in the uppermost position thereof. The apparatus is accordingly well suited for installation in hospital rooms and offices offering limited mounting space or restricted head room without interfering with normal usage of the room and while at the same time providing the additional advantages of free access to the X-ray table from all sides and ends thereof.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for supporting an X-ray tube head for horizontal and vertical adjusting movement above a work station comprising track means adapted to be mounted above said station, a longitudinal carriage supported on said track means for movement lengthwise thereof, a transverse carriage supported by said longitudinal carriage for movement thereon transversely of said track means, a support for said tube head, drive means on said transverse carriage connected with said support for raising and lowering said support to adjust the vertical position of said tube head, a plurality of relatively vertically adjustable means forming a connection between said support and said transverse carriage separate from said raising and lowering means, and spaced cooperating guide means on said vertically adjustable means for maintaining said vertically adjustable means in laterally braced relation to secure said tube head against lateral movement during operation thereof.

2. Apparatus for supporting an X-ray tube head for horizontal and vertical adjusting movement above a work station comprising track means adapted to be mounted above said station, a longitudinal carriage supported on said track means for movement lengthwise thereof, a transverse carriage supported by said longitudinal carriage for movement thereon transversely of said track means, a support for said tube head, a plurality of vertical carriages connected together for relative vertical movement, means securing said tube head support to one of said vertical carriages for movement therewith, means on said transverse carriage for supporting another of said vertical carriages for vertical movement with respect to said transverse carriage, means connected with said vertical and transverse carriages for counterbalancing said vertical carriages to provide for free vertical adjusting movement of said tube head, and cooperating parts on said transverse and vertical carriages for bracing said vertical carriages against lateral movement to maintain said tube head support in laterally and angularly fixed relation with said transverse carriage.

3. Apparatus for supporting an X-ray tube head for horizontal and vertical adjusting movement above a work station comprising track means adapted to be mounted above said station, a longitudinal carriage supported on said track means for movement lengthwise thereof, a transverse carriage supported by said longitudinal carriage for movement thereon transversely of said track means, a support for said tube head, a plurality of vertical carriages connected together for relative vertical movement, means on said transverse carriage connected with one of said vertical carriages to support said one vertical carriage for vertical movement with respect to said transverse carriage, means securing said tube head support to another of said vertical carriages for movement therewith to adjust the vertical position of said tube head, and cooperating means on said transverse and vertical carriages for bracing said vertical carriages against lateral movement to maintain said tube head support in laterally and angularly fixed relation with said transverse carriage.

4. Apparatus for supporting an X-ray tube head for horizontal and vertical adjusting movement above a work station comprising a horizontally movable carriage, means above said work station supporting said carriage for movement in a horizontal plane, a support for said tube head, a track mounted on said carriage and extending downwardly therefrom, a plurality of vertically movable carriages, means mounting the uppermost of said vertically movable carriages on said track, means securing said tube head support to the lowermost of said vertically movable carriages for movement therewith, certain of said vertically movable carriages including tracks supporting the next lower said vertically movable carriage for vertical movement thereon, and means on said vertically movable carriages cooperating with said tracks to brace said carriages against lateral and angular movement.

5. Apparatus for supporting an X-ray tube head for horizontal and vertical adjusting movement above a work station comprising a horizontally movable carriage, means above said work station for supporting said carriage for movement in a horizontal plane, a support for said tube head, a track mounted on said carriage and extending downwardly therefrom, a plurality of vertically movable carriages, means mounting the uppermost of said vertical carriages for vertical movement on said track, means securing said tube head support to the lowermost of said vertical carriages for movement therewith, said vertical carriages including tracks supporting the next lower said carriage for vertical movement thereon, each said track including a rigid plate of substantial width, and each said vertical carriage having rollers thereon engaging both sides of said track plate on another of said carriages to brace said vertical carriages against lateral and angular movement.

6. Apparatus for supporting an X-ray tube head for horizontal and vertical adjusting movement above a work station comprising a horizontally movable carriage, means above said work station for supporting said carriage for movement in a horizontal plane, a support for said tube head, power operated means on said carriage for supporting said tube head support for vertical adjusting movement, guiding means forming a vertically adjustable connection between said tube head support and said carriage separate from said power operated means for bracing said support against lateral and angular movement with respect to said carriage, and means carried by said guide means and said carriage for counterbalancing the weight of said guide means.

7. Apparatus for supporting an X-ray tube head for horizontal and vertical adjusting movement above a work station comprising a horizontally movable carriage, means above said work station for supporting said carriage for movement in a horizontal plane, a support for said tube head, power operated means on said carriage for supporting said tube head support for vertical adjusting movement, a plurality of relatively movable vertical carriages mounted on said horizontally movable carriage and forming a vertically adjustable connection between said tube head support and said horizontally movable carriage separate from said power operated means for bracing and guiding movement of said support, said plurality of vertical carriages including an uppermost carriage mounted on said horizontally movable carriage and a lowermost carriage secured to said tube head support, and control means connected with said vertical carriages and said horizontally movable carriage for effecting progressive relative movement of said vertical carriages to cause said lowermost carriage to have maximum travel with said tube head support with respect to said horizontal carriage and to cause said uppermost vertical carriage to have minimum travel with respect to said horizontal carriage.

8. Apparatus for supporting an X-ray tube head for horizontal and vertical adjusting movement above a work station comprising a horizontally movable carriage, means above said work station for supporting said carriage for movement in a horizontal plane, a support for said tube head, a plurality of relatively movable vertical carriages mounted on said horizontally movable carriage and forming a vertically adjustable bracing and guiding connection between said tube head support and said horizontally movable carriage, means securing one of said vertical carriages to said tube head support, and power operated means on said horizontal carriage supporting each said vertical carriage for simultaneous vertical adjusting movement at different relative speeds to provide different total vertical travels for each said vertical carriage with respect to said horizontal carriage.

9. Apparatus for supporting an X-ray tube head for horizontal and vertical adjusting movement above a work station comprising a horizontally movable carriage, means above said work station for supporting said carriage for movement in a horizontal plane, a support for said tube head, drive means on said carriage connected with said tube head support and forming a main support for raising and lowering said tube head support, a normally inoperative safety support for said tube head support including a safety cable connected to said tube head support and means on said carriage for normally causing said safety cable to travel freely up and down with said tube head support, and means on said carriage responsive to breakage of said main support for securing said safety cable against movement with respect to said carriage to prevent dropping of said tube head.

10. Apparatus for supporting an X-ray tube head for horizontal and vertical adjusting movement above a work station comprising a horizontally movable carriage, means above said work station for supporting said carriage for movement in a horizontal plane, a support for said tube head, means on said carriage including a main cable connected with said tube head support for supporting said tube head support for vertical adjusting movement, means including a drum on said carriage and a safety cable on said drum and connected with said tube head support for supporting said tube head support upon breakage of said main cable, means normally causing said drum to rotate in response to vertical movement of said tube head support to raise and lower said safety cable at the same predetermined rate as said main cable, and control means connected with said drum and responsive to acceleration of said safety cable for stopping movement of said drum to prevent further downward movement of said tube head support.

11 Apparatus for supporting an X-ray tube head for horizontal and vertical adjusting movement above a work station comprising a horizontally movable carriage, means above said work station for supporting said carriage for movement in a horizontal plane, a support for said tube head, power operated means on said carriage and connected with said tube head support for supporting said tube head support for vertical adjusting movement, guiding means forming a vertically adjustable connection between said tube head support and said carriage separate from said power operated means for bracing said support against lateral and angular movement with respect to said carriage, means on said guide means establishing a lower limit position for said tube head support, and control means for said power operated means responsive to movement of said tube head support to said lower limit position for discontinuing operation of said power operated means in the direction to lower said tube head support.

12. Apparatus for supporting an X-ray tube head for horizontal and vertical adjusting movement above a work station comprising a horizontally movable carriage, means above said work station for supporting said carriage for movement in a horizontal plane, a support for said tube head, means including a drum on said carriage and a cable connecting said drum with said tube head support for supporting said tube head support, a reversible drive for said drum to effect raising and lowering of said support, sensing means on said carriage engaging said cable and movable in response to slackening of said cable, and means actuated by movement of said sensing means for discontinuing said drive to prevent fouling of said cable.

13. Apparatus for supporting an X-ray tube head for horizontal and vertical adjusting movement above a work station comprising a horizontally movable carriage, means above said work station for supporting said carriage for movement in a horizontal plane, a support for said tube head, drive means on said carriage for raising and lowering said support, a column extending downwardly from said carriage, vertically movable means in said column forming a vertically adjustable connection between said tube head support and said carriage for bracing said support with respect to said carriage, a scale within said column, means defining an indexing mark on said column cooperating with said scale, means on said carriage connected with said scale for moving said scale with respect to said index, and means connecting said scale moving means with said tube head support and responsive to movement of said tube head support for actuating said scale moving means to correlate said scale and said index mark in accordance with vertical position of said tube head with respect to a predetermined reference position.

14. Apparatus for supporting an X-ray tube head for horizontal and vertical adjusting movement above an X-ray table comprising tracks adapted to be mounted above said table, a longitudinal carriage supported on said tracks for movement lengthwise thereof, a transverse carriage supported by said longitudinal carriage for movement thereon transversely of said tracks, said tracks being correlated in length with said table to provide for full travel of said longitudinal carriage lengthwise of said table, said longitudinal carriage being correlated in length with the width of said table to provide for full travel of said transverse carriage transversely of said table, a support for said tube head, means on said transverse carriage connected with said tube head support and supporting said tube head support for raising and lowering movement, means on said transverse carriage for maintaining said support in guided relation with said transverse carriage preventing swaying or twisting thereof, means for locking said longitudinal carriage with respect to said tracks, means for locking said transverse carriage with respect to said longitudinal carriage, and selectively operable means for operating each of said locking means to provide selectively for movement of said longitudinal carriage with said transverse carriage locked thereto and for movement of said transverse carriage with said longitudinal carriage locked to said tracks.

15. Apparatus for supporting an X-ray tube head for horizontal and vertical adjusting movement above a work station comprising track means adapted to be mounted above said station, a longitudinal carriage supported on said track means for movement lengthwise thereof, a transverse carriage supported by said longitudinal carriage for movement thereon transversely of said track means, means on said transverse carriage connected with said tube head and supporting said tube head for vertical adjusting movement, a first locking member carried by said track means, a second locking member carried by said longitudinal carriage, a longitudinal lock on said longitudinal carriage for engaging said first locking member, a transverse lock on said transverse carriage for engaging said second locking member, a locking block on said transverse carriage adapted for selective engagement with said first locking member, means on said transverse carriage supporting said locking block for movement on said transverse carriage, and means on said transverse carriage for limiting said movement of said locking block to provide for corresponding limited movement of said transverse carriage with respect to said longitudinal carriage when said longitudinal lock is locked and said transverse lock is released and to provide for corresponding limited movement of said longitudinal carriage when said transverse lock is locked and said longitudinal lock is released.

16. Apparatus for supporting an X-ray tube head for horizontal and vertical adjusting movement above a work station comprising track means adapted to be mounted above said station, a longitudinal carriage supported on said track means for movement lengthwise thereof, a transverse carriage supported by said longitudinal carriage for movement thereon transversely of said track means, means on said transverse carriage connected with said tube head and supporting said tube head for vertical adjusting movement, a first locking member carried by said track means, a second locking member carried by said longitudinal carriage, a longitudinal lock on said longitudinal carriage for engaging said first locking member, a transverse lock on said transverse carriage for engaging said second locking member, a locking block on said transverse carriage adapted for selective engagement with said first locking member, means on said transverse carriage supporting said locking block for movement on said transverse carriage, means on said transverse carriage for limiting said movement of said locking block, means on said transverse carriage normally balancing said locking block in centered relation with respect to the limits of said movement thereof, and means on said transverse carriage for locking said block on said first locking member to provide for movement of said transverse carriage limited by contact of said block with said limiting means when said longitudinal lock is locked and said transverse lock is released and to provide for movement of said longitudinal carriage limited by contact of said block with said limiting means when said transverse lock is locked and said longitudinal lock is released.

17. Apparatus for supporting an X-ray tube head for horizontal and vertical adjusting movement above a work station comprising a horizontally movable carriage, means above said work station for supporting said carriage for movement in a horizontal plane, a support for said tube head, a track mounted on said carriage and extending downwardly therefrom, a first vertical carriage mounted for vertical movement on said track and including a second track thereon, a second vertical carriage mounted for vertical movement on said second track and including a third track, a third vertical carriage mounted for vertical movement on said third track, means securing said tube head support to said third vertical carriage, and means on said horizontally movable carriage and connected with said vertical carriages for effecting vertical movement of said vertical carriages in coordinated relation with vertical movement of said support to adjust the vertical position of said tube head while maintaining said tube head in guided and braced relation with said horizontally movable carriage.

18. An adjustable support structure for a ray source comprising an elongated beam member, a carrier frame movable on and longitudinally of said beam member, an additional beam mounted on said carrier frame in position extending outwardly of and at substantially right angles to said beam member to provide an overhanging beam portion, a carriage supported on and movable longitudinally of said overhanging beam portion toward and away from said elongated beam member, a series of telescopically interfitting frames each mounted on and adjustable longitudinally of the next adjacent frame of the series, one of said frames comprising a supported end frame of the series being secured on said carriage in position depending therefrom, and mounting means for mounting the ray source on another of said frames comprising a supporting end frame of the series, the movable mass of certain of said telescopically interfitting frames being counterbalanced upon the next adjacent frame of the series on which the counterbalanced frame is supported.

19. An adjustable support structure for a ray source as defined in claim 18 including a plurality of vertically extending track surfaces on each of said frames except said supporting end frame, certain of each said plurality of track surfaces being arranged at right angles to each other, each of said frames except said supported end frame having thereon a plurality of rollers engaging said track surfaces on the next higher said frame, said rollers on each said frame being spaced vertically thereon and certain of each said plurality of track surfaces and the associated said rollers being arranged at right angles to the others of said plurality of said track surfaces and rollers to provide effective bracing action against lateral and angular movement of said frames and thereby to maintain said ray source in laterally and angularly fixed relation with said carriage, and cooperating means connected between certain of said frames for counterbalancing said frames to provide for free vertical adjusting movement of said ray source.

References Cited in the file of this patent

UNITED STATES PATENTS

| | | |
|---|---|---|
| 481,814 | Overholt | Aug. 30, 1892 |
| 566,193 | Kuenneth et al. | Aug. 18, 1896 |
| 783,526 | Kemmerer | Feb. 28, 1905 |
| 1,076,333 | Tucker | Oct. 21, 1913 |
| 1,090,154 | Johns | Mar. 17, 1914 |
| 1,630,181 | Isherwood | May 24, 1927 |
| 1,761,832 | Johansson | June 3, 1930 |
| 1,808,224 | Holmes | June 2, 1931 |
| 1,815,074 | Schaefer | July 21, 1931 |
| 1,881,087 | Martin | Oct. 4, 1932 |
| 1,926,902 | Kelley | Sept. 12, 1933 |
| 1,985,715 | Bucky | Dec. 25, 1934 |
| 2,139,772 | Ringe | Dec. 13, 1938 |
| 2,315,786 | Grobe | Apr. 6, 1943 |
| 2,476,776 | Smathers | July 19, 1949 |
| 2,491,228 | Swift | Dec. 13, 1949 |
| 2,588,124 | Kizaur | Mar. 4, 1952 |